(No Model.)
B. W. GRIST.
ADJUSTABLE SHEAVE SUPPORT.
No. 486,402. Patented Nov. 15, 1892.
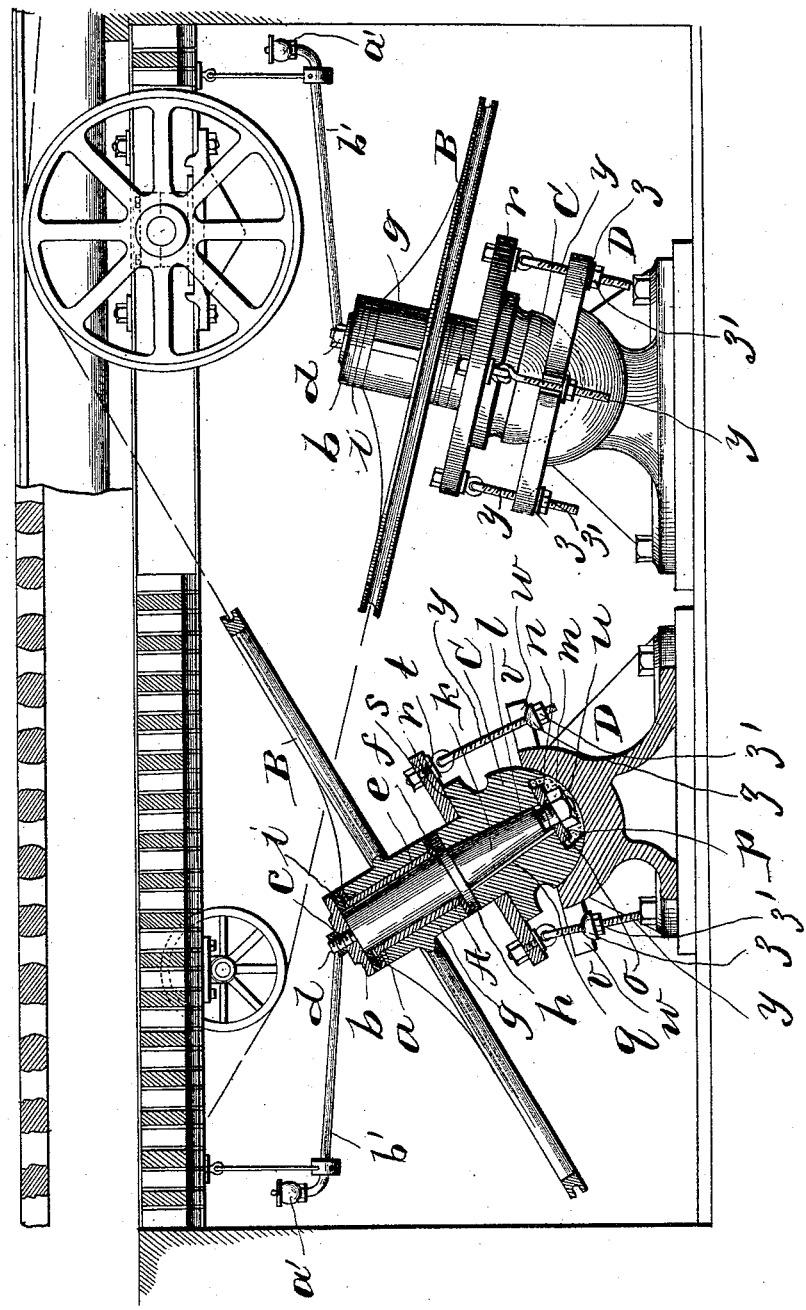
Witnesses
G. A. Tauberschmidt
H. B. Reinohl
Inventor
Benjamin W. Grist
By D. C. Reinohl
Attorney
THE NORRIS PETERS CO., PHOTO-LITHO., WASHINGTON, D. C.

UNITED STATES PATENT OFFICE.

BENJAMIN W. GRIST, OF PHILADELPHIA, PENNSYLVANIA, ASSIGNOR TO THE PENNSYLVANIA IRON WORKS COMPANY, OF SAME PLACE.

ADJUSTABLE SHEAVE-SUPPORT.

SPECIFICATION forming part of Letters Patent No. 486,402, dated November 15, 1892.

Application filed August 11, 1892. Serial No. 442,778. (No model.)

*To all whom it may concern:*

Be it known that I, BENJAMIN W. GRIST, a citizen of the United States, residing at Philadelphia, in the county of Philadelphia and State of Pennsylvania, have invented certain new and useful Improvements in Adjustable Sheave-Supports; and I do hereby declare the following to be a full, clear, and exact description of the invention, such as will enable others skilled in the art to which it appertains to make and use the same.

My present invention relates to means for supporting a revoluble sheave for general use; but in this instance I have shown it applied to cable-railway machinery and located in a vault for the purpose of supporting the sheave used to direct the cable from the power-drum to the cable-conduit in a roadway.

The invention will be fully disclosed in the following specification and claims.

The accompanying drawing, which forms part of this specification, represents a vertical section of a cable-vault, showing one of the sheaves and its supporting-shaft in section and the other in side elevation.

Reference being had to the drawing and the letters thereon, A indicates a shaft, stud, or spindle having a journal $a$ at its upper end, upon which is revolubly supported a sheave B, which is secured upon the shaft by a disk $b$, through which extends a bolt $c$ from the end of the shaft and a nut $d$. The journal $a$ is surrounded by a sleeve bearing or bushing $e$ of antifriction metal, preferably phosphor-bronze, and at the lower end of the bushing $e$ is an annular bearing-plate $f$ of the same material, which is interposed between the lower end of the hub $g$ of the sheave and the collar $h$ on the shaft A, which supports the sheave. A similar plate $i$ is interposed between the upper end of the hub $g$ and the disk $b$, the sleeve-bearing $e$ and the plates $f$ and $i$ serving to take or sustain the wear of the revolving sheave. The journal $a$ is supplied with lubricant from cup $a'$ through tube $b'$.

The lower section $k$ of the shaft A is preferably tapered and is supported in a semispherical bearing C, which is provided with a central conical bore $l$ to receive the tapered section $k$ of the shaft A, and the shaft is fixedly secured in the bore $l$ by a nut $m$, engaging a screw-bolt $n$ and resting upon a washer $o$ in a recess $p$ in the lower end of the bearing. The shaft may be provided with a spline $q$ to prevent the possibility of its turning. At the upper end of the bearing C is a concentric seat $r$, upon which a clamping-plate $s$ is supported, and said plate is provided with eyebolts $t$, the eyes being on the under side of the plate.

D indicates the base in which the bearing C is supported, and is provided with a semispherical cavity or seat $u$ in its upper end, which corresponds with the contour of the outer surface of the bearing C, and with a flange $v$, having holes $w$ for the reception of eyebolts $y$, and concave seats on the under side of the flange for the convex washers $z$, upon which the nuts $z'$ rest.

To set the sheave B at the angle of inclination required to give the proper lead to the cable, the bolts $y$ are loosened by unscrewing the nuts $z'$ and the sheave adjusted on the bearing C and its base D until the sheave has assumed the proper position, when the bolts are again tightened by drawing up the nuts $z'$ and the bearing C, secured, which will hold the shaft A and the sheave in fixed relation to the cable-drum and the sheave E in the cable-conduit F in the road-bed.

Having thus fully described my invention, what I claim is—

1. The combination of a base having a concave bearing-seat in its upper end, a sheave-support having a semispherical bearing adapted to and adjustable in said seat and provided with a concentric seat to receive a clamping-plate, an annular clamping-plate engaging said concentric seat, and a sheave revoluble on said support.

2. The combination of a shaft having a cylindrical and conical section, a sheave revolubly mounted on said cylindrical section, a semispherical bearing having a conical bore in which the conical section of the shaft is rigidly secured, a base having a semispherical seat, and means for adjustably securing the bearing in the seat.

3. The combination of a shaft having a journal at one end, a sheave revolubly supported on said journal, a bearing separate from the shaft and to which the lower end of the shaft is rigidly secured, a concentric seat at the upper end of said bearing, a clamping-plate on said seat, a base having a seat for said bearing and provided with a surrounding flange, and bolts for connecting the clamping-plate to said flange.

In testimony whereof I affix my signature in presence of two witnesses.

B. W. GRIST.

Witnesses:
    JAMES E. GRIST,
    EMANUEL NAGLÉ.